United States Patent [19]
Lang

[11] 3,857,861
[45] Dec. 31, 1974

[54] PROCESS FOR THE PREPARATION OF DI-LOWER ALKOXY-3,5-PHTHALIC ANHYDRIDES

[75] Inventor: Gerard Lang, Epinay-sur-Seine, France

[73] Assignee: Societe Anonyme dite: L'Oreal, Paris, France

[22] Filed: Sept. 7, 1971

[21] Appl. No.: 178,425

[30] Foreign Application Priority Data
Sept. 7, 1970  Luxembourg.......................... 61655

[52] U.S. Cl. ............................................ 260/346.6
[51] Int. Cl............................................... C07c 63/14
[58] Field of Search ................................. 260/346.6

[56] References Cited
OTHER PUBLICATIONS
McElvain et al., J. Amer. Chem. Soc., (1944) Vol. 66, pp. 1077–1083.

Primary Examiner—John D. Randolph
Assistant Examiner—Bernard Dentz
Attorney, Agent, or Firm—Cushman, Darby & Cushman

[57]  ABSTRACT

Lower 3,5-dialkoxy phthalic anhydrides of the formula:

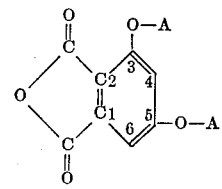

where A is a lower alkyl radical having 1 to 4 carbon atoms, are prepared in good yields by reacting a halogen-maleic anhydride with an excess of 1,1-dialkoxy ethylene in the presence of a solvent according to the disclosed process. The lower 3,5-dialkoxy phthalic anhydrides are useful as intermediates for the synthesis of anthraquinonic compounds.

6 Claims, No Drawings

PROCESS FOR THE PREPARATION OF DI-LOWER ALKOXY-3,5-PHTHALIC ANHYDRIDES

BACKGROUND OF THE INVENTION

The present invention relates to the preparation of lower 3,5-dialkoxy phthalic anhydrides in a direct manner and in high yields.

The preparation of 1,3-diethoxy anthraquinone has already been described by MacElvain et al. in J. Amer. Chem. Soc. 66, 1077 (1944) in a process in which an excess of 1,1-diethoxy ethylene or ketene diethyl acetal is reacted with 2-bromo-1,4-naphthoquinone. Similarly,3-ethoxy-5-methyl-1, 6-dihydro phthalic anhydride has been prepared by the reaction of 1,1-diethoxy-3-methyl butadiene on maleic anhydride as described by S. M. MacElvain and L. R. Morris in J. Amer. Chem. Soc. 74, 2657 (1952).

The preparation of lower 3,5-dialkoxy phthalic anhydrides in a direct manner and in high yields has heretofore not been described.

DETAILED DESCRIPTION OF THE INVENTION

According to the present invention, a halogen-maleic anhydride is caused to react with a molar excess of 1,1-dialkoxy ethylene in the presence of a solvent to produce lower 3,5-dialkoxy phthalic anhydrides in a direct manner and in high yields.

More particularly it has now been discovered that 3,5-dialkoxy phthalic anhydrides of the formula:

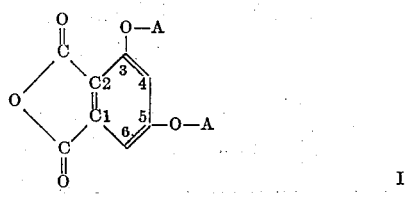

I where A represents a lower alkyl group having 1 to 4 carbon atoms, are prepared by reacting a halogen-maleic anhydride on a molar excess of a 1,1-dialkoxy ethylene of the formula:

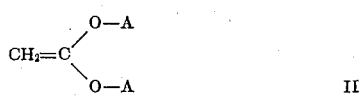

II where A again represents a lower alkyl group having 1 to 4 carbon atoms, as mentioned above. The reaction occurs generally according to the following equation:

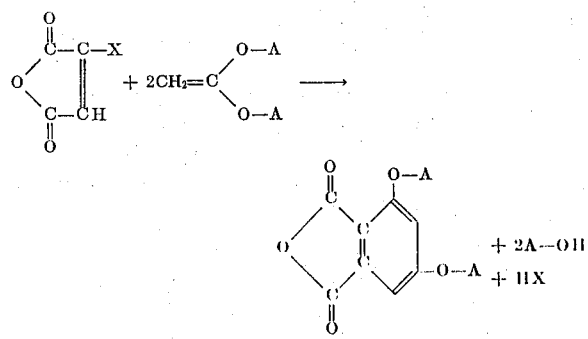

In this reaction A represents a lower alkyl group having 1 to 4 carbon atoms and X is a halogen. The reaction is highly exothermic in nature and is carried out in the presence of a suitable non-reacting anhydrous solvent with cooling, the temperature being maintained within the range of from about $-20°$ C to about $+50°C$. Two moles of alkanol A—OH and one mole of hydrohalic acid are formed during the course of the reaction.

After substantial completion of the reaction a highly colored reaction mixture results and is allowed to stand, the desired 3,5-dialkoxy phthalic anhydride product is separated as a precipitate and is purified by recrystallization in an appropriate solvent or mixture of solvents in a known manner. According to this process and using correct practice yields of the order of 35 to 50% of phthalic anhydrides having alkoxy substituents in the 3- and 5- positions are obtained, all without undesirable secondary reactions.

As the 1,1-dialkoxy ethylene there may be used any lower alkoxy ethylene having 1 to 4 carbon atoms such as 1,1-dimethoxy ethylene, 1,1-diethoxy ethylene, 1,1-dipropoxy ethylene, and 1,1-dibutoxy ethylene. The 1,1-dialkoxy ethylene is present in the reaction in molar excess and generally the molar ratio of the halogen-substituted maleic anhydride to the 1,1-dialkoxy ethylene is about 1: 2 to about 1 : 5. As the halogen identified in the above general reaction as X fluorine, chlorine and bromine may be present on the maleic anhydride.

The reaction is preferably conducted, for reasons of convenience and economy, at atmospheric pressure, although higher and lower pressures may be applied. The reaction solvent is any suitable anhydrous solvent that remains liquid within the temperature range of $-20°$ C to $+50°$ C and does not react with the reactants to give undesirable side products. Reaction solvents include, by way of example, anhydrous sulfuric ether, isopropyl ether, hexane, and the like. Mixtures of two or more of the above solvents may also be used. Solvents for recrystallization of the 3,5-dialkoxy phthalic anhydrides produced according to the invention will be readily apparent and include, by way of example, dioxane, cyclohexane, benzene, sulfuric ether, ligroine, and the like as well as mixtures of two or more solvents.

The lower 3,5-dialkoxy phthalic anhydrides produced according to the process of the present invention are useful as intermediate compounds for the synthesis of anthraquinonic compounds.

The following are non-limiting examples to illustrate preferred embodiments of the invention. Unless otherwise indicated all parts and percentages are by weight.

Example 1: Preparation of 3,5-diethoxy phthalic anhydride

In an ice-cooled vessel fitted with a dropping funnel, agitator and reflux coolant, there was introduced 0.02 mole chloromaleic anhydride in 30 ml anhydrous sulfuric ether. 0.10 mole 1,1-diethoxy ethylene was added dropwise with agitation. The reaction was highly exothermic but was maintained at a temperature of 20 °C and the reaction mixture immediately turned dark red. After about 120 minutes the reaction was completed and the reaction mixture was allowed to stand for one hour. The precipitate that formed was separated from the reaction mixture by filtration. This precipitate was recrystallized in a dioxane-cyclohexane mixture representing about 1 parts of dioxane to 1 parts of cyclohexane, and the 3,5-diethoxy phthalic anhydride was recovered in a yield of 37%, in the form of very pale yellow crystals having a melting point of 137°. The established melting point for 3,5-diethoxy phthalic anhydride is 137–138° according to P. Fritsh, An 296, 358 (1897).

Example 2: Preparation of 3,5-dimethoxy phthalic anhydride

In an ice-cooled vessel fitted with a dropping funnel, agitator and reflux cooler there was introduced 0.02 mole chloromaleic anhydride in 30 ml anhydrous sulfuric ether. 0.10 mole of 1,1-dimethoxyethylene was added dropwise, with agitation. The reaction was highly exothermic but was maintained at a temperature of about 25° C and the reaction mixture immediately turned dark red. After about 120 minutes the reaction was completed and the reaction mixture was allowed to stand for one hour. The precipitate that formed was separated from the reaction mixture by filtration. This precipitate was recrystallized in benzene, and 3,5-dimethoxy phthalic anhydride is obtained in a 55% yield, as pale yellow crystals with a melting point of 146°.

In a similar manner and using the proportions of reactants of examples 1 and 2, 1,1-dibutoxy ethylene is reacted with chloromaleic anhydride to produce 3,5-dibutoxy phthalic anhydride.

Using the procedures and quantities of reactants mentioned in Examples 1 and 2, 3,5-dipropoxy phthalic anhydride is prepared from chloromaleic anhydride and 1,1-dipropoxy ethylene.

I claim:

1. A process for the preparation of 3,5-dialkoxy phthalic anhydride of the formula:

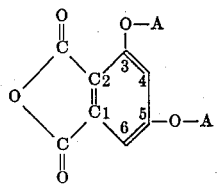

wherein A is alkyl having 1 to 4 carbon atoms comprising
  a. reacting a monohalogen-substituted maleic anhydride with an excess of 1,1-dialkoxy ethylene of the formula:

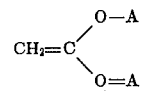

wherein A has the significance given above, at a temperature of about −20° C to about +50° C in the presence of an anhydrous non-reactive solvent having a boiling point greater than 50°C, and
  b. separating the 3,5-dialkoxy phthalic anhydride thus produced from the reaction mixture.

2. The process of claim 1 wherein the molar ratio of monohalogen-substituted maleic anhydride to 1,1-dialkoxy ethylene is from 1:2 to 1 : 5.

3. The process of claim 1 wherein the anhydrous non-reactive solvent is selected from the group consisting of anhydrous sulfuric ether, benzene, isopropyl ether, and hexane.

4. The process of claim 1 including the additional step of:
  c. recrystallizing the 3,5-dialkoxy phthalic anhydride separated in step (b) in a solvent mixture of dioxane and cyclohexane.

5. The process of claim 1 wherein the monohalogen-substituted maleic anhydride is chloromaleic anhydride and the 1,1-dialkoxy ethylene is 1,1-diethoxy ethylene.

6. The process of claim 1 wherein the monohalogen-substituted maleic anhydride is chloromaleic anhydride and the 1,1-dialkoxy ethylene is 1,1-dimethoxy ethylene.

* * * * *